US012761341B2

(12) United States Patent
Cohen et al.

(10) Patent No.: US 12,761,341 B2
(45) Date of Patent: Oct. 13, 2026

(54) METAMATERIAL ASSET TAGS FOR DEVICE TRACKING IN A 3D SPACE

(71) Applicant: Infinitus Holdings Inc., Penn Valley, PA (US)

(72) Inventors: Joshua Ian Cohen, Penn Valley, PA (US); John Cronin, Jericho, VT (US)

(73) Assignee: Infinitus Holdings Inc., Penn Valley, PA (US)

( * ) Notice: Subject to any disclaimer, the term of this patent is extended or adjusted under 35 U.S.C. 154(b) by 131 days.

(21) Appl. No.: 18/808,970

(22) Filed: Aug. 19, 2024

(65) Prior Publication Data

US 2026/0050078 A1 Feb. 19, 2026

(51) Int. Cl.
*G01S 13/68* (2006.01)
*G01S 13/02* (2006.01)
*G01S 13/34* (2006.01)

(52) U.S. Cl.
CPC ............ *G01S 13/68* (2013.01); *G01S 13/341* (2013.01); *G01S 2013/0245* (2013.01)

(58) Field of Classification Search
CPC ................... G01S 13/68; G01S 13/341; G01S 2013/0245; G01S 13/878; H04B 7/04013
See application file for complete search history.

(56) References Cited

U.S. PATENT DOCUMENTS 5,539,413 A 7/1996 Farrell et al.
6,047,192 A 4/2000 Maloney et al.
6,307,475 B1 10/2001 Kelley
6,691,947 B2 2/2004 La Fata
7,592,957 B2 9/2009 Achour et al.
(Continued)

FOREIGN PATENT DOCUMENTS

BR 112019019353 4/2020
CA 3056593 9/2018
(Continued)

OTHER PUBLICATIONS

Barbera et al., "Signals from the crowd: uncovering social relationships through smartphone probes," Proceedings of the 2013 Conference on Internet Measurement Conference, IMC '13, Jan. 1, 2013, pp. 265-276.
(Continued)

*Primary Examiner* — William Kelleher
*Assistant Examiner* — Kenneth W Good
(74) *Attorney, Agent, or Firm* — Polsinelli LLP

(57) ABSTRACT

A system for tracking devices in a wireless environment metamaterial asset tags. The system includes asset tags that can be tracked by a device with a generic phase array design. These tags may be organized into tag groups with similar properties. A signal module may transmit and receive signals from the tags. Once a tag belonging to a tag group is identified, the system may use a phased array design optimized for that tag group. A frequency module and beamforming module further tailor the system to the specific tag group. A signal processing module processes the signal using methods optimized for the tag group. The processed signal data is then sent to a user device, which includes a tag tracking module to integrate the signal data with other data available to the user device. The integrated data is visualized in real-time on the user's device.

20 Claims, 5 Drawing Sheets

(56) References Cited

U.S. PATENT DOCUMENTS 7,764,232 B2 7/2010 Achour et al.
7,855,696 B2 12/2010 Gummalla et al.
8,072,291 B2 12/2011 Itoh et al.
8,085,199 B2 12/2011 Grau Besoli et al.
8,154,340 B2 4/2012 Dupuy et al.
8,237,519 B2 8/2012 Achour
8,299,967 B2 10/2012 Xu et al.
8,368,595 B2 2/2013 Lee et al.
8,384,600 B2 2/2013 Huang et al.
8,421,615 B2 4/2013 Ryu et al.
8,451,175 B2 5/2013 Gummalla et al.
8,451,183 B2 5/2013 Penev et al.
8,547,286 B2 10/2013 Xu et al.
8,610,635 B2 12/2013 Huang et al.
8,674,891 B2 3/2014 Lopez et al.
8,725,777 B2 5/2014 Deking et al.
8,928,530 B2 1/2015 Achour et al.
8,989,053 B1 3/2015 Skaaksrud et al.
9,190,735 B2 11/2015 Xu et al.
9,641,964 B2 5/2017 Kulkarni et al.
9,739,878 B2 8/2017 Gudim et al.
9,887,465 B2 2/2018 Gummalla et al.
9,900,742 B1 2/2018 Thoresen et al.
9,904,509 B1 2/2018 Raffa et al.
9,936,442 B1 4/2018 Noonan et al.
9,989,633 B1 6/2018 Pandey et al.
10,085,118 B1 9/2018 Thoresen et al.
10,341,814 B2 7/2019 Thoresen et al.
10,470,675 B2 11/2019 Zhang et al.
10,587,987 B2 3/2020 Thoresen et al.
10,721,590 B2 7/2020 Thoresen et al.
10,942,256 B2 * 3/2021 Achour .................... H01Q 3/36
10,969,486 B2 4/2021 Thoresen et al.
11,455,411 B2 9/2022 Alameh et al.
11,573,317 B2 2/2023 Thoresen et al.
11,861,546 B1 1/2024 Wang et al.
12,159,256 B1 12/2024 Zeng et al.
12,198,698 B1 1/2025 Benster et al.
12,412,465 B1 * 9/2025 Daoura .................. H04W 4/80
12,442,915 B1 10/2025 Cohen et al.
12,498,447 B1 12/2025 Wichgers
2002/0008657 A1 1/2002 Poore
2002/0019829 A1 2/2002 Shapiro
2002/0111173 A1 8/2002 Hendrey et al.
2002/0164995 A1 11/2002 Brown et al.
2002/0183072 A1 12/2002 Steinbach et al.
2003/0003933 A1 1/2003 Deshpande et al.
2003/0020623 A1 1/2003 Cao et al.
2003/0048224 A1 3/2003 Benner et al.
2003/0054813 A1 3/2003 Riley et al.
2003/0083046 A1 5/2003 Mathis
2003/0096621 A1 5/2003 Jana et al.
2003/0096628 A1 5/2003 Bar-On et al.
2003/0100326 A1 5/2003 Grube et al.
2003/0186716 A1 10/2003 Dorenbosch et al.
2004/0111184 A1 6/2004 Chiappetta et al.
2004/0235568 A1 11/2004 Kim
2005/0020279 A1 1/2005 Markhovsky et al.
2005/0113123 A1 5/2005 Torvinen
2005/0149443 A1 7/2005 Torvinen
2005/0210104 A1 9/2005 Torvinen
2005/0221812 A9 10/2005 Gailey et al.
2005/0233776 A1 10/2005 Allen et al.
2007/0081503 A1 4/2007 Mower
2007/0127634 A1 6/2007 Katsumi
2008/0062049 A1 3/2008 Soler Castany et al.
2009/0167787 A1 7/2009 Bathiche et al.
2009/0201850 A1 8/2009 Davis et al.
2009/0219213 A1 9/2009 Lee et al.
2010/0109971 A2 5/2010 Gummalla et al.
2010/0134254 A1 6/2010 Kim
2010/0287485 A1 11/2010 Bertolami et al.
2011/0095964 A1 4/2011 Pathak et al.
2011/0125063 A1 5/2011 Shalon et al.
2011/0183683 A1 7/2011 Das et al.
2011/0257812 A1 10/2011 Carpenter et al.
2011/0273321 A1 11/2011 Joshi et al.
2012/0307645 A1 12/2012 Grosman et al.
2013/0044128 A1 2/2013 Liu et al.
2013/0099898 A1 4/2013 Bloy
2013/0142384 A1 6/2013 Ofek
2013/0222371 A1 8/2013 Reitan
2013/0231130 A1 9/2013 Cherian et al.
2013/0278464 A1 10/2013 Xia et al.
2013/0342564 A1 12/2013 Kinnebrew et al.
2014/0018059 A1 1/2014 Noonan
2014/0231499 A1 8/2014 Simmons, Jr.
2014/0266619 A1 * 9/2014 Ali .......................... G01S 11/02
340/10.1
2014/0285375 A1 9/2014 Crain
2015/0062558 A1 3/2015 Koppal et al.
2015/0116144 A1 4/2015 Olmedo et al.
2015/0147067 A1 5/2015 Ryan et al.
2015/0221135 A1 8/2015 Hill et al.
2015/0241959 A1 8/2015 Abovitz et al.
2015/0287422 A1 10/2015 Short et al.
2015/0302665 A1 10/2015 Miller
2015/0319568 A1 11/2015 Haro et al.
2015/0319687 A1 11/2015 Farley et al.
2015/0334768 A1 11/2015 Ranasinghe et al.
2015/0348538 A1 12/2015 Donaldson
2015/0356782 A1 12/2015 Miller et al.
2015/0382148 A1 12/2015 Agarwal et al.
2016/0050525 A1 2/2016 Droll et al.
2016/0117688 A1 4/2016 Ghosh et al.
2016/0161607 A1 6/2016 Turner et al.
2016/0189416 A1 6/2016 Naguib et al.
2016/0292744 A1 10/2016 Strimaitis et al.
2017/0006430 A1 1/2017 Chao et al.
2017/0026805 A1 1/2017 Smith et al.
2017/0089739 A1 3/2017 Gallo et al.
2017/0188066 A1 6/2017 Gaidar et al.
2017/0238136 A1 8/2017 Smith
2017/0251400 A1 8/2017 Jha et al.
2017/0301200 A1 10/2017 Siminoff
2017/0336220 A1 11/2017 Broaddus et al.
2017/0337813 A1 11/2017 Taylor
2018/0091940 A1 3/2018 Gonzalez et al.
2018/0123257 A1 5/2018 Henry et al.
2018/0172824 A1 6/2018 Beckett et al.
2018/0173494 A1 6/2018 Choi et al.
2018/0253681 A1 9/2018 Stiefel et al.
2018/0270608 A1 9/2018 Thoresen et al.
2018/0270612 A1 9/2018 Thoresen et al.
2018/0365898 A1 12/2018 Costa
2019/0034673 A1 1/2019 Koch et al.
2019/0043259 A1 2/2019 Wang et al.
2019/0079176 A1 * 3/2019 Weissman ............. G01S 13/751
2019/0132685 A1 5/2019 Skoglund et al.
2019/0173156 A1 6/2019 Hu
2019/0182627 A1 6/2019 Thoresen et al.
2019/0195998 A1 6/2019 Campbell
2020/0025911 A1 1/2020 Rappaport
2020/0074386 A1 3/2020 Mossoba et al.
2020/0074743 A1 3/2020 Zheng et al.
2020/0118290 A1 4/2020 Liu et al.
2020/0137516 A1 4/2020 Thoresen et al.
2020/0200892 A1 * 6/2020 Rajab .................... G01S 13/753
2020/0201513 A1 6/2020 Malmed et al.
2020/0204375 A1 6/2020 Coulmeau et al.
2020/0279279 A1 9/2020 Chaudhuri
2020/0309944 A1 10/2020 Thoresen et al.
2020/0372442 A1 11/2020 Tennill et al.
2021/0104154 A1 4/2021 Yokoyama et al.
2021/0142055 A1 5/2021 Broggi
2021/0215818 A1 7/2021 Kim et al.
2021/0223389 A1 7/2021 Ikefuji et al.
2021/0271949 A1 9/2021 Forster
2021/0318428 A1 10/2021 Thoresen et al.
2021/0374485 A1 12/2021 Pilcher et al.
2021/0391917 A1 12/2021 Morozs et al.
2021/0405182 A1 12/2021 Reynolds et al.
2022/0044681 A1 2/2022 Agarwal
2022/0078578 A1 3/2022 Brumley et al.

(56) References Cited

U.S. PATENT DOCUMENTS

| | | | |
|---|---|---|---|
| 2022/0084066 A1 | 3/2022 | Kisko et al. | |
| 2022/0091259 A1 | 3/2022 | Hucks et al. | |
| 2022/0094036 A1 | 3/2022 | Yong et al. | |
| 2022/0107387 A1 | 4/2022 | Chayat et al. | |
| 2022/0196782 A1 | 6/2022 | Dawar et al. | |
| 2022/0256310 A1 | 8/2022 | Volkerink et al. | |
| 2022/0284883 A1 | 9/2022 | Buchter et al. | |
| 2022/0311112 A1 | 9/2022 | Wang et al. | |
| 2022/0375477 A1 | 11/2022 | Tan et al. | |
| 2023/0056831 A1 | 2/2023 | Manolakos et al. | |
| 2023/0128484 A1 | 4/2023 | Turbiner et al. | |
| 2023/0189024 A1 | 6/2023 | Tran et al. | |
| 2023/0258763 A1 | 8/2023 | Donderici | |
| 2023/0259798 A1 | 8/2023 | Modugula et al. | |
| 2023/0290342 A1 | 9/2023 | Kim et al. | |
| 2023/0298462 A1 | 9/2023 | Witt | |
| 2023/0319699 A1 | 10/2023 | Kiss et al. | |
| 2023/0334850 A1 | 10/2023 | Harvey et al. | |
| 2023/0353450 A1 | 11/2023 | Wang | |
| 2023/0360389 A1 | 11/2023 | Tiballi | |
| 2023/0408627 A1 | 12/2023 | Bao et al. | |
| 2024/0022565 A1 | 1/2024 | Keith, Jr. | |
| 2024/0188109 A1 | 6/2024 | Bao et al. | |
| 2024/0204878 A1 | 6/2024 | Howe et al. | |
| 2024/0214452 A1 | 6/2024 | Skaaksrud | |
| 2024/0220543 A1 | 7/2024 | Blake et al. | |
| 2025/0094380 A1 | 3/2025 | Mazed | |
| 2025/0111845 A1 | 4/2025 | Thiruchengode Vajravel et al. | |
| 2025/0142289 A1 | 5/2025 | Seo et al. | |
| 2025/0180369 A1 | 6/2025 | Gurgul et al. | |
| 2025/0190723 A1* | 6/2025 | Reddy | H04W 4/80 |
| 2025/0299157 A1* | 9/2025 | Hiscock | G06K 19/0723 |
| 2025/0349040 A1 | 11/2025 | Aberman et al. | |
| 2025/0392884 A1* | 12/2025 | Austin | H04W 4/029 |
| 2026/0039016 A1* | 2/2026 | Duron | H01Q 5/28 |
| 2026/0052450 A1 | 2/2026 | Cohen et al. | |
| 2026/0056703 A1 | 2/2026 | Ramasamy et al. | |
| 2026/0073426 A1 | 3/2026 | Cohen et al. | |
| 2026/0073639 A1 | 3/2026 | Cohen et al. | |
| 2026/0073925 A1 | 3/2026 | Cohen et al. | |
| 2026/0080351 A1 | 3/2026 | Cohen et al. | |
| 2026/0080896 A1 | 3/2026 | Cohen et al. | |
| 2026/0086228 A1 | 3/2026 | Cohen et al. | |
| 2026/0086229 A1 | 3/2026 | Cohen et al. | |
| 2026/0087522 A1 | 3/2026 | Cohen et al. | |
| 2026/0181575 A1 | 6/2026 | Cohen et al. | |
| 2026/0243886 A1 | 8/2026 | Cohen et al. | |

FOREIGN PATENT DOCUMENTS

| | | |
|---|---|---|
| CN | 102473266 A | 5/2012 |
| CN | 103166691 A | 6/2013 |
| CN | 104380279 A | 2/2015 |
| CN | 104569964 | 4/2015 |
| CN | 110390944 A | 10/2019 |
| CN | 110637480 | 12/2019 |
| CN | 112788288 A | 5/2021 |
| CN | 213818098 U | 7/2021 |
| CN | 114487804 A | 5/2022 |
| CN | 115622626 A | 1/2023 |
| CN | 116959455 A | 10/2023 |
| EP | 3596977 | 1/2020 |
| IL | 269372 A | 11/2019 |
| JP | 2017-067624 | 4/2017 |
| JP | 2020-515205 | 5/2020 |
| WO | 2012082155 A2 | 6/2012 |
| WO | WO 2016/109455 | 7/2016 |
| WO | WO 2018/169558 | 9/2018 |
| WO | WO 2019/089201 | 5/2019 |
| WO | WO 2019/113418 | 6/2019 |
| WO | WO 2019/210284 | 10/2019 |
| WO | 2024045166 A1 | 3/2024 |
| WO | PCT/US25/41389 | 8/2025 |
| WO | PCT/US25/42467 | 8/2025 |
| WO | PCT/US25/42470 | 8/2025 |
| WO | PCT/US25/43788 | 8/2025 |
| WO | PCT/US25/45237 | 9/2025 |
| WO | PCT/US25/45239 | 9/2025 |
| WO | PCT/US25/45240 | 9/2025 |
| WO | PCT/US25/46455 | 9/2025 |
| WO | PCT/US25/47258 | 9/2025 |
| WO | PCT/US25/47341 | 9/2025 |
| WO | PCT/US25/47602 | 9/2025 |
| WO | PCT/US25/48302 | 9/2025 |
| WO | 2026036114 A1 | 2/2026 |
| WO | 2026043820 A1 | 2/2026 |
| WO | 2026043822 A1 | 2/2026 |
| WO | 2026050412 A1 | 3/2026 |
| WO | 2026055553 A1 | 3/2026 |
| WO | 2026055555 A1 | 3/2026 |
| WO | 2026055556 A1 | 3/2026 |
| WO | 2026060404 A1 | 3/2026 |
| WO | 2026064678 A1 | 3/2026 |
| WO | 2026064706 A1 | 3/2026 |
| WO | 2026072596 A2 | 4/2026 |
| WO | 2026073038 A1 | 4/2026 |

OTHER PUBLICATIONS

Pang et al., "802.11 user fingerprinting," Proceedings of the 13th Annual ACM International Conference on Mobile Computing and Networking, ACM, Montreal, Quebec, Canada, Sep. 9, 2007, pp. 99-110.

Scheuner et al., "Probr—A Generic and Passive WiFi Tracking System" 2016 IEEE 41st Conference on Local Computer Networks.

EP Application No. 2017901233.7, Extended European Search Report dated Jul. 31, 2020.

Israeli Application No. 269372, Office Action dated Jul. 27, 2021.

Mexican Application No. MX/a/2019/010955, Second Office Action dated Jun. 27, 2022.

Mexican Application No. MX/a/2019/010955, First Office Action dated Jan. 12, 2022.

PCT Application No. PCT/US2018/064420, International Search Report and Written Opinion dated Mar. 1, 2019.

PCT Application No. PCT/US2018/064420, International Preliminary Report on Patentability dated Jun. 18, 2020.

PCT Application No. PCT/US2017/033428, International Search Report and Written Opinion dated Aug. 1, 2017.

PCT Application No. PCT/US2017/033428, International Preliminary Report on Patentability dated Sep. 26, 2019.

PCT Application No. PCT/US2018/055157, International Search Report and Written Opinion dated Dec. 20, 2018.

PCT Application No. PCT/US2018/055157, International Preliminary Report on Patentability dated May 14, 2020.

PCT Application No. PCT/US2019/029507, International Search Report and Written Opinion dated Jul. 2, 2019.

PCT Application No. PCT/US2019/029507, International Preliminary Report on Patentability dated Nov. 5, 2020.

U.S. Appl. No. 15/802,399, Office Action dated Aug. 30, 2018.

U.S. Appl. No. 16/437,299, Office Action dated Feb. 5, 2020.

U.S. Appl. No. 17/222,928, Office Action dated Sep. 29, 2022.

U.S. Appl. No. 18/799,909, Joshua Ian Cohen, Graphene-Based Phased Array Antenna for Device Tracking, filed Aug. 9, 2024.

U.S. Appl. No. 18/808,382, Joshua Ian Cohen, Hybrid Phased Antenna Array for Device Tracking, Aug. 19, 2024.

U.S. Appl. No. 18/827,531, Joshua Ian Cohen, Voice Identifcation via Radio Wave Demodulation, Sep. 6, 2024.

U.S. Appl. No. 18/817,639, Joshua Ian Cohen, Method and System for Determining Device Orientation Within Augmented Reality Applications, filed Aug. 28, 2024.

U.S. Appl. No. 18/826,822, Joshua Ian Cohen, Systems and Methods for Marker Placement in Augmented Reality, filed Sep. 6, 2024.

U.S. Appl. No. 18/826,846, Joshua Ian Cohen, Camera-Integrated Wireless 3D Mapping and Tracking System, filed Sep. 6, 2024.

U.S. Appl. No. 18/886,872, Joshua Ian Cohen, Augmented Reality Package Drop Point System, filed Sep. 16, 2024.

U.S. Appl. No. 18/891,448, Joshua Ian Cohen, Dynamic User-Tracking Digital Signage System and Method, filed Sep. 20, 2024.

(56) References Cited

OTHER PUBLICATIONS

U.S. Appl. No. 18/890,430, Joshua Ian Cohen, Wireless Device Fingerprinting Systems and Methods, Sep. 19, 2024.
U.S. Appl. No. 18/897,590, Joshua Ian Cohen, High-Edge Antennas for Optimized SAR Performance, filed Sep. 26, 2024.
U.S. Appl. No. 18/895,234, Joshua Ian Cohen, Wireless Base Station Deployment for Target Mapping, Sep. 24, 2024.
Chen et al., "THz Beamforming Using Graphene-Based Devices," Mar. 28, 2013, Retrieved from online Oct. 10, 2025, Retrieved from URL: https://ieeexplore.ieee.org/abstract/document/6486639.
Wang et al., "UWHear: Through-wall Extraction and Separation of Audio Vibrations Using Wireless Signals," Sensys '20: Proceedings of the 18th Conference on Embedded Networked Sensor Systems, Nov. 16, 2020, 14 pages. Retrieved on Nov. 3, 2025, URL: https://doi.org/10.1145/3384419.3430772.
U.S. Appl. No. 18/891,448, Office Action dated Aug. 27, 2025.
PCT Application No. PCT/US2025/041389, International Search Report and Written Opinion dated Oct. 20, 2025.
PCT Application No. PCT/US2025/042470, International Search Report and Written Opinion dated Nov. 4, 2025.
PCT Application No. PCT/US2025/045237, International Search Report and Written Opinion dated Nov. 20, 2025.
PCT Application No. PCT/US2025/043788, International Search Report and Written Opinion dated Oct. 21, 2025.
PCT Application No. PCT/US2025/045239, International Search Report and Written Opinion dated Nov. 20, 2025.
PCT Application No. PCT/US2025/045240, International Search Report and Written Opinion dated Nov. 25, 2025.
PCT Application No. PCT/US2025/046455, International Search Report and Written Opinion dated Jan. 9, 2026.
PCT Application No. PCT/US2025/047341, International Search Report and Written Opinion dated Nov. 18, 2025.
PCT Application No. PCT/US2025/047258, International Search Report and Written Opinion dated Dec. 3, 2025.
PCT Application No. PCT/US2025/048302, International Search Report and Written Opinion dated Dec. 11, 2025.
U.S. Appl. No. 18/827,531, Office Action dated Apr. 22, 2026.
U.S. Appl. No. 18/826,822, Office Action dated Mar. 18, 2026.
U.S. Appl. No. 18/891,448, Final Office Action dated Mar. 2, 2026.
Park et al., "Autoencoder-based signal modulation and demodulation methods for sonobuoy signal transmission and reception," Sensors, vol. 22, No. 6510, Aug. 29, 2022, 15 pages.
Apple: "iPhone 14 Pro - Technical Specifications," 2022, Downloaded on May 29, 2026. URL: https://support.apple.com/en-US/111850, 17 pages.
Rowland, S. L., "Understanding Our Digital Fingerprints: Metadata, Competency, and the Future Practice of Law," University of St. Thomas Law Journal, vol. 20, No. 1, pp. 276-294.
Ying, Z., "Antennas in Cellular Phones for Mobile Communications," Proceedings of the IEEE, vol. 100, No. 7, Mar. 16, 2012, 11 pages.
U.S. Appl. No. 18/799,909, Office Action dated Jun. 30, 2026.
U.S. Appl. No. 19/355,976, Office Action dated Jun. 2, 2026.
U.S. Appl. No. 18/826,846, Office Action dated May 28, 2026.
U.S. Appl. No. 18/891,448, Office Action dated Jun. 12, 2026.
U.S. Appl. No. 18/890,430, Office Action dated Jun. 3, 2026.
Huang, B. et al., "Cloud removal from optical satellite imagery with SAR imagery using sparse representation," IEEE Geoscience and Remote Sensing Letters, 12.5 (2015): 1046-1050. (Year: 2015).
Pourshamsi, M. et al., "A machine-learning approach to PollnSAR and LiDAR data for improved tropical forest canopy height estimation using NASA AfriSAR Campaign data," IEEE Journal of Selected Topics in Applied Earth Observations and Remote Sensing, 11.10 (2018): 3453-3463. (Year: 2018).
Sandberg, M., "Land cover mapping with multi-temporal SAR and optical satellite data," (2016) (Year: 2016).
U.S. Appl. No. 18/897,590, Office Action dated Jul. 28, 2026.

* cited by examiner

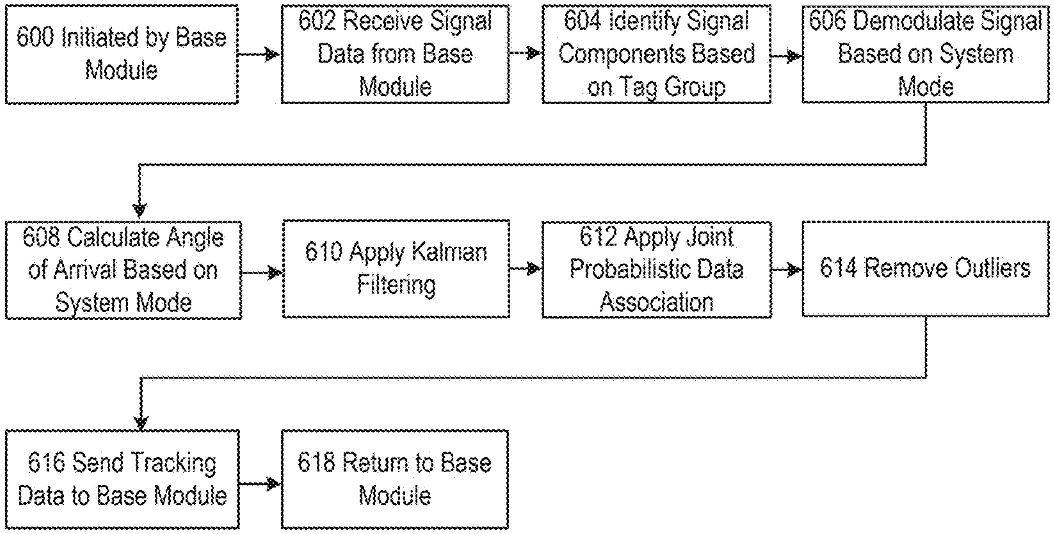

FIG. 6

| Mode | Tag Group | Phased Antenna Array ID | Frequency | Beamforming Method | Signal Processing Algorithms |
|---|---|---|---|---|---|
| T1 | Group 1 | A | 30 MHz | Digital | Demodulation: Pattern Recognition<br>AoA: MUSIC (Multiple Signal Classification) algorithm |
| T2 | Group 2 | B | 300-350 MHz | Orthogonal Frequency Division Multiplexing | Demodulation: Hybrid Modulation Recognition<br>AoA: Estimation of Signal Parameter via Rotational Invariance Technique (ESPRIT) |
| T3 | Group 3 | C | 720-750 MHz | Frequency-Domain Beamforming | Demodulation: Phase-Locked Loop<br>AoA: Phase Interferometry |
| - | - | | - | - | - |
| - | - | | - | - | - |

FIG. 7

METAMATERIAL ASSET TAGS FOR DEVICE TRACKING IN A 3D SPACE

FIELD OF THE DISCLOSURE

The present disclosure is generally related to systems and methods of device tracking using a phased array.

BACKGROUND

Tracking devices often require a power system to be detected at long range. This significantly increases the required size of the device due to an internal battery or power system. Passive devices can be much more compact because they reflect signals or transmit only when they receive a signal. However, these devices are often only effective at short ranges.

A system specialized for a particular tag would be optimal for detecting passive tracking devices at a longer range. However, a specialized system would not be able to detect multiple types of tracking devices unless they had very similar properties.

SUMMARY

Disclosed herein are systems and methods of device tracking using a phased array that solves the aforementioned problems and disadvantages.

According to one aspect, a system for tracking devices in an environment includes a plurality of metamaterial asset tags, each metamaterial asset tag being attached to a particular device to be tracked, and each metamaterial asset tag belonging to a particular tag group. The system also includes a phased antenna array and at least one processor operatively connected to the phased antenna array. The system further includes a memory operatively connected to the at least one processor and storing instructions that are executable by the at least one processor to perform a method. The method includes transmitting, via the phased antenna array, a first signal to the plurality of metamaterial asset tags. The method also includes receiving, via the phased antenna array, one or more response signals for one or more metamaterial asset tags of the plurality of metamaterial asset tags, respectively. The method further includes, for each metamaterial asset tag corresponding to the one or more response signals: determining a direction of the metamaterial asset tag based on the response signal; determining a tag group for the metamaterial asset tag based on the response signal; retrieving from a mode database, based on the determined tag group, at least one frequency, a beamforming method, and at least one signal processing algorithm; transmitting, via the phased antenna array, a beamformed signal using the at least one frequency and the beamforming method in the direction of the metamaterial asset tag; receiving, via the phased antenna array, an updated response signal from the metamaterial asset tag; and using the at least one signal processing algorithm to determine a location of the metamaterial asset tag based on the updated response signal.

In some configurations, determining the direction of the metamaterial asset tag based on the response signal includes determining an Angle of Arrival (AoA) of the response signal using phase and time delay data from the response signal.

In certain implementations, the at least one frequency includes a plurality of frequencies, and transmitting the beamformed signal includes transmitting the beamformed signal using each of the plurality of frequencies.

In various examples, the first signal is modulated by the metamaterial asset tag before transmitting the response signal. In some examples, using the at least one signal processing algorithm to determine a location of the metamaterial asset tag based on the updated response signal includes triangulating the location of the metamaterial asset tag using phase and time delay data from the updated response signal.

In additional implementations, the phased antenna array includes a plurality of phased antennas, and the method includes determining, based on the determined tag group, ones of the plurality of phased antennas to use for transmitting the beamformed signal.

In further examples, the beamforming method is selected from the group consisting of digital, orthogonal frequency division multiplexing, and frequency-domain beamforming.

In some configurations, the signal processing algorithm includes a demodulation algorithm selected from the group consisting of pattern recognition, hybrid modulation recognition, and phase-locked loop.

In certain implementations, the signal processing algorithm includes an Angle of Arrival (AoA) algorithm selected from the group consisting of Multiple Signal Classification (MUSIC), Estimation of Signal Parameter via Rotational Invariance Technique (ESPRIT), and Phase Interferometry.

In additional configurations, the system includes a communication interface configured to transmit the location of each multimedia asset tag to a user device.

According to another aspect, a method for tracking devices in an environment includes providing a plurality of metamaterial asset tags, each metamaterial asset tag being attached to a particular device to be tracked, and each metamaterial asset tag belonging to a particular tag group, as well as a phased antenna array. The method also includes transmitting, via the phased antenna array, a first signal to the plurality of metamaterial asset tags and receiving, via the phased antenna array, one or more response signals for one or more metamaterial asset tags of the plurality of metamaterial asset tags, respectively. The method further includes, for each metamaterial asset tag corresponding to the one or more response signals: determining a direction of the metamaterial asset tag based on the response signal; determining a tag group for the metamaterial asset tag based on the response signal; retrieving from a mode database based on the determined tag group at least one frequency, a beamforming method, and at least one signal processing algorithm; transmitting, via the phased antenna array, a beamformed signal using the at least one frequency and the beamforming method in the direction of the metamaterial asset tag; receiving, via the phased antenna array, an updated response signal from the metamaterial asset tag; and using the at least one signal processing algorithm to determine a location of the metamaterial asset tag based on the updated response signal.

BRIEF DESCRIPTION OF THE DRAWINGS

FIG. 6 is a flowchart of a method performed by a Signal Processing Module according to an embodiment.

FIG. 7 illustrates a Mode Database according to an embodiment.

DETAILED DESCRIPTION

Embodiments of the present disclosure will be described more fully hereinafter with reference to the accompanying drawings in which like numerals represent like elements throughout the several figures. Aspects of the disclosed systems and methods may be embodied in many different forms and should not be construed as limited to the embodiments set forth herein. The examples set forth herein are non-limiting and are merely some among many possible examples.

Figure 1:
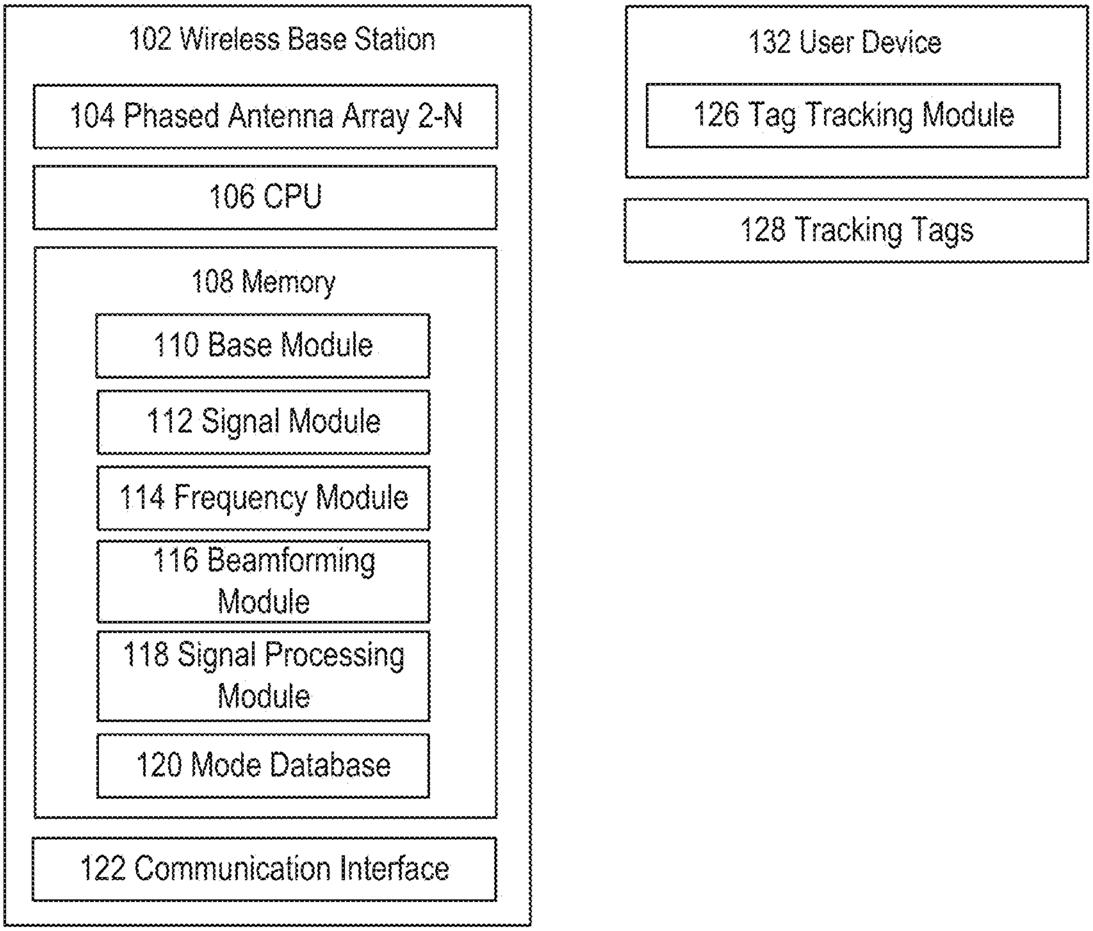
FIG. 1 is a schematic diagram of a phased array tracking system according to an embodiment.

FIG. 1 is a schematic diagram of a phased array tracking system 100 (or simply "system 100"). The system 100 may include a wireless base station 102, which may track the location of one or more signal sources. The wireless base station 102 may also be a type of wireless router that allows for a Bluetooth, cellular, or other type of signal frequency connection or broadcast. In one embodiment, the wireless base station 102 may be for military grade synthetic aperture radar signals. The wireless base station 102 may include a phased antenna array 104 comprised of multiple individual antennas, each capable of transmitting and/or receiving electromagnetic signals. The wireless base station 102 receives signals from one or more sources using the phased antenna array 104. It triangulates the location of the source using an angle of arrival (AoA) calculation based on the difference in phase and time of the received signals. The wireless base station 102 may have active and passive functionality, which may be separate modes or may both function simultaneously. Passive functionality may refer to only receiving signals from sources, whereas active functionality may refer to transmitting to a device in order to elicit a response.

Achieving centimeter-level accuracy in 3D mapping is useful for applications that require precise positioning and spatial awareness. The system 100 is designed to provide this high level of precision, ensuring that positioning can be accurately determined within centimeter-level tolerances, or better, in 3D space. To enhance the capabilities of 3D mapping, the data obtained from the wireless base station 102 can be integrated with various other 3D mapping technologies. For instance, synthetic aperture radar (SAR) can be utilized to offer additional spatial data, leveraging its ability to produce high-resolution images and detect changes over time. Incorporating camera-based systems can provide visual context and details that may not be captured by the phased antenna array alone. Ultrasound technology can also be employed, especially in environments where optical or radar-based systems might face challenges, such as underwater or in densely cluttered areas. Additionally, LIDAR technology can be integrated to measure distances by illuminating targets with laser light and measuring the reflection with a sensor, which is useful in applications like autonomous vehicles and topographic mapping. Combining these technologies allows for a more comprehensive 3D mapping process, enhancing accuracy and applicability across various fields. For example, in urban planning, combining phased array data with LIDAR can create detailed city models. In agriculture, integrating data from SAR and drones can help in precise crop monitoring and land use planning. In search and rescue operations, combining ultrasound with phased array data can assist in locating individuals in challenging environments. This approach ensures that the 3D mapping solution is effective in a wide range of scenarios, meeting the diverse needs of different industries and applications. The wireless base station 102 may be mounted to a delivery truck.

The system 100 may further include two or more phased antenna arrays 104, which may be an array of antennas that receive and/or transmit at different phases. Each phased array 104 may include any combination of receiver antennas, transmitter antennas, and antennas capable of both receiving and transmitting signals, thereby providing versatile communication capabilities. Each phased antenna array 104 may include at least one antenna capable of transmission for the active functions of the wireless base station 102, such as beamforming, signal amplification, and directed communication. Each phased antenna array 104 may also include at least two antennas capable of receiving for the triangulation functions of the wireless base station 102. These receiving antennas facilitate precise location determination of signal sources through techniques such as angle of arrival (AoA) estimation. The antennas may be arranged in a specific geometric configuration, such as linear, circular, or planar arrays, and electronically connected such that their individual signal phases and amplitudes can be controlled. This electronic control enables the phased array to dynamically steer the beam direction, enhance signal strength, and reduce interference from unwanted sources.

Each phased antenna array 104 may incorporate advanced signal processing algorithms to optimize its performance. These algorithms may include adaptive beamforming, which adjusts the phase and amplitude of each antenna element to maximize signal reception from desired directions while minimizing noise and interference. Each phased antenna array 104 may also support multiple-input multiple-output (MIMO) technology, allowing simultaneous transmission and reception of multiple data streams, thereby increasing the overall data throughput and reliability of the system 100.

Each phased antenna array 104 may be integrated with a control unit that monitors and adjusts the operational parameters of each antenna element in real-time. This control unit may utilize feedback mechanisms to dynamically adapt to changing environmental conditions and signal propagation characteristics, ensuring optimal performance under various scenarios. The integration of these features within each phased antenna array 104 enhances the system's capability to provide robust and efficient communication and precise triangulation of signal sources. Each phased antenna array 104 may include a low noise amplifier (LNA) to amplify weak incoming signals from multiple antennas while minimizing noise. The LNA may include a number of channels which each correspond to a specific antenna in the phased array, enhancing sensitivity and accuracy. Each phased antenna array 104 may be made from advanced materials, such as graphene or metamaterials, so as to deliver the increased sensitivity needed for certain applications.

Each phased antenna array 104 may have its own unique configuration based on a group of tracking tags 128. For example, the phased antenna array 104 for tag group 1 may have 16 antennas arranged in a circular pattern, with each antenna measuring 1 cm×1 cm and spaced 2 cm apart. For another example, the phased antenna array 104 for tag group 2 may have 32 antennas arranged in a linear pattern, with each antenna measuring 0.5 cm×0.5 cm and spaced 0.25 cm apart. In some embodiments, a phased antenna array 104 may be reconfigurable with moveable and/or adjustable elements. In these embodiments, one phased antenna array 104 may include multiple phased antenna array configurations, which remove the need to have multiple phased antenna arrays 104.

The system 100 may further include a computer processing unit (CPU) 106, which may be configured to decode and execute any instructions received from one or more other electronic devices or server(s). The CPU 106 may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The CPU 106 may be configured to execute one or more computer-readable program instructions, such as program instructions, to carry out any of the functions described in this description. The CPU 106 may be a GPU such as those produced by Nvidia®

The system 100 may further include memory 108, which may include but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or another type of media/machine-readable medium suitable for storing electronic instructions. The memory may include modules implemented as a program.

The system 100 may further include a base module 110, which may be initiated when the wireless base station 102 is powered on and/or activated. The base module 110 may initiate the signal module 112. The base module 110 may receive signal data from the signal module 112. The base module 110 may select the first detected tracking tag 128 in the signal data. The base module 110 may set the system 100 to the mode in the mode database 120 that matches the tag group. This mode may affect the functions of the other modules of the system 100. The base module 110 may initiate the frequency module 114. The base module 110 may receive a frequency, or range of frequencies, from the frequency module 114. The base module 110 may initiate the beamforming module 116 and send in the frequency from the frequency module 114 and the tracking tag 128 direction in the signal data. The base module 110 may receive a beamforming algorithm from the beamforming module 116. The base module 110 may reinitiate the signal module 112 and send in the frequency from the frequency module 112 and the beamforming algorithm from the beamforming module 116. The base module 110 may receive signal data from the signal module 112. The base module 110 may initiate the signal processing module 118. The base module 110 may receive processed signal data from the signal processing module 118. The base module 110 may send the processed signal data to the user device 124 via the communication interface 122. The base module 110 may repeat this process for each detected tracking tag 128.

The system 100 may further include a signal module 112, which may transmit and receive signals from one or more phased antenna arrays 104. The signal module 112 first transmits a signal, which is reflected and possibly modulated, from one or more tracking tags 128. The signal module 112 may then collect the reflected signal data. The signal module 112 may receive data from the base module 110 on which frequency to transmit, phase shift instructions for beamforming, and which phased antenna array 104 or arrays from which to collect data.

The system 100 may further include a frequency module 114, which may determine which frequency or frequencies to transmit based on the system mode determined by the base module 110.

The system 100 may further include a beamforming module 116, which may generate a beamforming algorithm based on the selected frequency or frequencies from the frequency module 114, the phased antenna array 104 for the current system mode, and the direction of the tracking tag 128.

The system 100 may further include a signal processing module 118, which may process the signals received by the phased antenna array 104 in order to locate the source of the signal in 3-dimensional space. The signal processing module 118 may utilize sophisticated computational techniques such as Kalman filters and joint probabilistic data association to accurately estimate device locations and track their movements while maintaining synchronization among multiple antennas for precise triangulation. The signal processing module 118 may utilize a subnanosecond clock and a high-speed power meter for detecting the small differences in time between receiving a signal at two or more receiver antennas.

The system 100 may further include a mode database 120, which may contain the possible modes of the system 100. Each mode may be optimized to send and receive signals from a specific group of tracking tags 128. Mode entries may include optimal the phased antenna array 104, frequency or frequencies, and signal processing algorithms used for the specific group of tracking tags 128.

The system 100 may further include a communication interface 122, which may be a set of hardware and/or software components that facilitate the exchange of data between different systems, devices, or components. The communication interface 122 serves as the conduit through which data is transmitted, received, and interpreted, ensuring seamless communication between the wireless base station 102 and the user device 124.

The system 100 may further include a user device 124, such as a laptop, smartphone, tablet, computer, or smart speaker. The user device 124 may include its own communication interface 122 and means of displaying data to a user.

The system 100 may further include a tag tracking module 126, which may receive tracking data from the wireless base station 102 and allow the user of the user device 124 to view and interact with the data. The data may be integrated with other data available to the user device 124, such as GPS or map data.

The system 100 may further include one or more tracking tags 128, which may be devices used to monitor and track the location, movement, and status of objects, animals, or people. Tracking tags 128 may actively emit a signal or may be passive and reflect or respond to an incoming signal. A tracking tag 128 may be both active and passive in that it can actively transmit or simply function passively. For example, a tracking tag 182 may start in active mode and when the battery or power supply is depleted the tracking tag 128 functions passively until power is available again. The tracking tag 128 may reflect signals to the wireless base station 102 with a unique modulation, serving as a distinct identifier. These tags can be manufactured via 3D printing or lithography and can make use of metamaterials in order to reduce their size. Small size is useful in increasing the portability and reducing the detectability of the tracking tags 128. Manufacturers may need to balance between the size of the tracking tags 128 and the range they are detectable by the wireless base station 102.

The design of tracking tags 128 can incorporate advanced materials and fabrication techniques to enhance their functionality and efficiency. For example, metamaterials, which exhibit unique electromagnetic properties not found in naturally occurring substances, can be utilized to create highly efficient antennas and circuitry within the tags, thereby optimizing their performance while maintaining a minimal footprint. The use of 3D printing technology allows for rapid prototyping and customization of tag designs, enabling the production of tags tailored to specific applications and environmental conditions.

The tracking tags 128 may be embedded in various objects, affixed to animals, or worn by individuals. In the context of asset tracking, the tags can be attached to valuable items or inventory, providing real-time location data and movement history, which is useful for supply chain management and loss prevention. In wildlife monitoring, tags can be used to study animal behavior and migration patterns, contributing to conservation efforts. For personal safety, individuals can wear tags to ensure their location is continuously monitored, which is particularly useful for vulnerable populations such as children, older people, or individuals working in hazardous environments.

The tracking tag 128 may operate across various frequency bands, depending on the application requirements and regulatory constraints. For instance, low-frequency tags might be used in scenarios requiring deep penetration through materials, while higher frequency tags could be utilized for high-precision tracking and data transmission. Additionally, the integration of sensors within the tags can provide supplementary data, such as temperature, humidity, shock, pressure, light level, noise level, electric fields, acceleration, gas levels, radioactivity and/or motion, further enhancing the system's utility in diverse applications.

Figure 2:
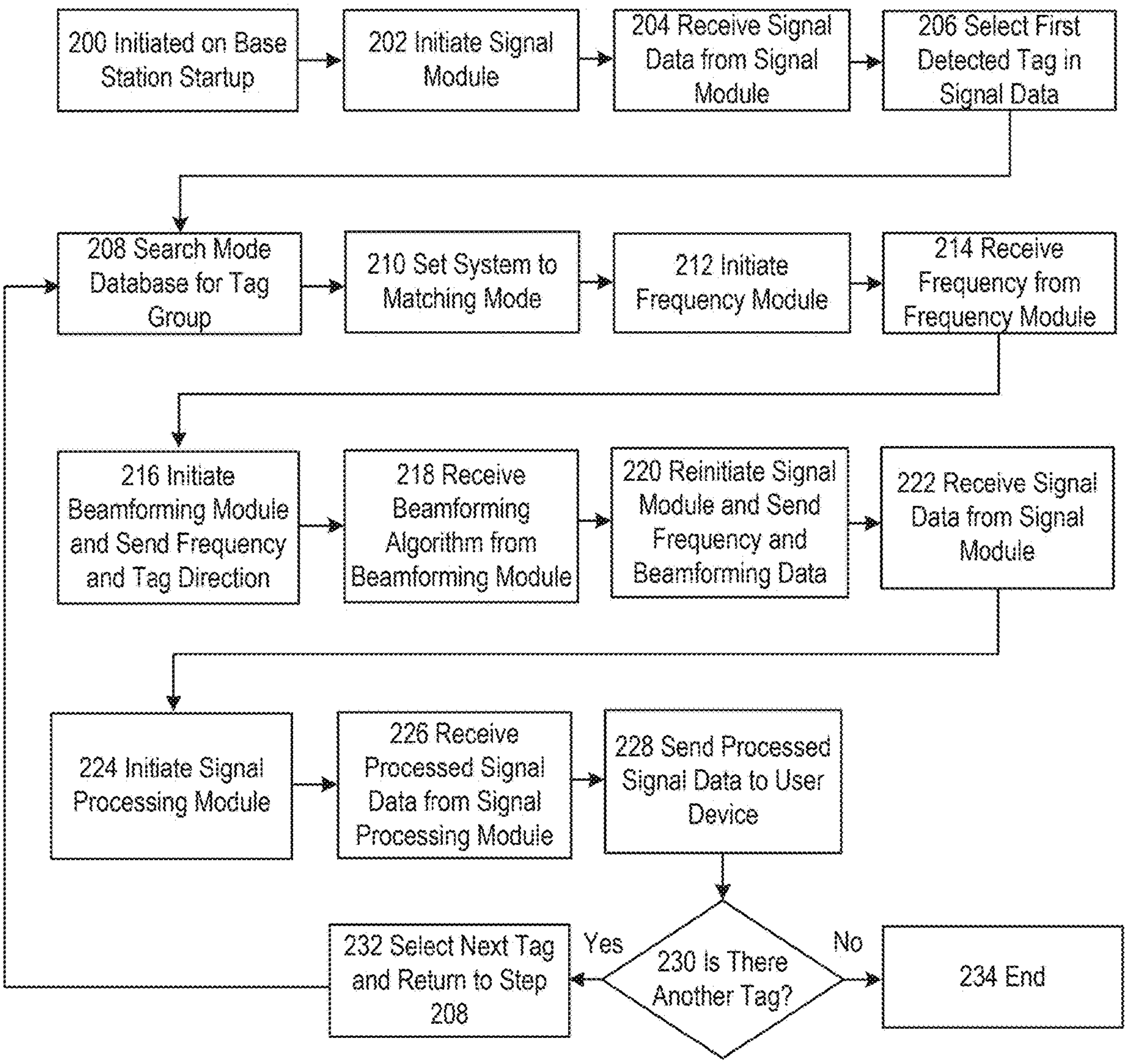
FIG. 2 is a flowchart of a method performed by a Base Module according to an embodiment.

FIG. 2 illustrates an example operation of the base module 110. The base module 110 may be initiated at step 200 when the wireless base station 102 is powered on and/or activated. The base module 110 may initiate at step 202, the signal module 112. The signal module 112, which may transmit and receive signals from one or more phased antenna arrays 104. The signal module 112 first transmits a signal, which is reflected and possibly modulated, from one or more tracking tags 128. The signal module 112 may then collect the reflected signal data.

The base module 110 may receive at step 204 signal data from the signal module 112. The signal data may contain signals from tracking tags 128. For example, the data may indicate that a group 1 tag is at 65° from the wireless base station 102 and a group 2 tag is at 135° from the wireless base station 102.

The base module 110 may select at step 206 the first detected tracking tag 128 in the signal data. First may refer to the tracking tag 128 detected first, or there may be some selection optimization method to select tracking tags 128 in an optimal order.

The base module 110 may search at step 208 the mode database 120 for the tag group of the selected tracking tag 128. Tag groups may refer to one or more types of tracking tag 128 grouped together based on their properties.

The base module 110 may set at step 210 the system 100 to the mode in the mode database 120 that matches the tag group. This mode may affect the functions of the other modules of the system 100.

The base module 110 may initiate at step 212, the frequency module 114. The frequency module 114 may determine which frequency or frequencies to transmit based on the system mode determined by the base module 110.

The base module 110 may receive at step 214 a frequency, or range of frequencies, from the frequency module 114. For example, for tag group 1, the received frequency may be 30 MHz.

The base module 110 may initiate at step 216 the beamforming module 116 and send in the frequency from the frequency module 114 and the tracking tag 128 direction in the signal data. The beamforming module 116 may generate a beamforming algorithm based on the selected frequency or frequencies from the frequency module 114, the phased antenna array 104 for the current system mode, and the direction of the tracking tag 128.

The base module 110 may receive at step 218 a beamforming algorithm from the beamforming module 116. The base module 110 may reinitiate at step 220 the signal module 112 and send in the frequency from the frequency module 112 and the beamforming algorithm from the beamforming module 116.

The base module 110 may receive at step 222 signal data from the signal module 112. This set of signal data is much more accurate than the original signal data with respect to the selected tracking tag 128.

The base module 110 may initiate at step 224, the signal processing module 118. The signal processing module 118 may process the signals received by the phased antenna array 104 in order to locate the source of the signal in 3-dimensional space. The signal processing module 118 may utilize sophisticated computational techniques such as Kalman filters and joint probabilistic data association to accurately estimate device locations and track their movements while maintaining synchronization among multiple antennas for precise triangulation. The signal processing module 118 may utilize a sub nanosecond clock and a high-speed power meter for detecting the small differences in time between receiving a signal at two or more receiver antennas.

The base module 110 may receive at step 226 processed signal data from the signal processing module 118. For example, the signal data may indicate that the selected tag is at the coordinates (91 cm, 181 cm, −2 cm). The signal data may also contain any data embedded in the reflected signal by the tracking tag 128, such as an identification code.

The base module 110 may send at step 228 the processed signal data to the user device 124 via the communication interface 122. The base module 110 may determine at step 230 if there is another tracking tag 128 that was detected in the original signal data from step 204. If there is another tracking tag 128, The base module 110 may select at step 232 the next tracking tag 128 and return to step 204. If all tracking tags 128 in the original signal data have been selected, the base module 110 may end at step 234. In some embodiments, the base module 110 may reset the system 100 to the default mode and return to step 202.

Figure 3:
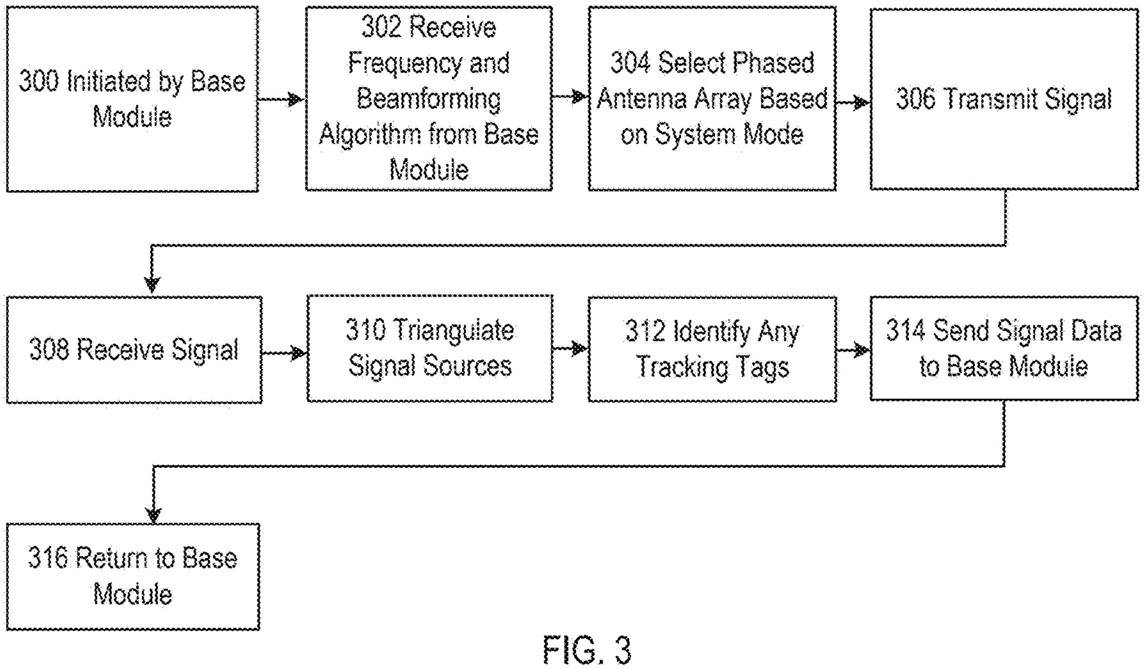
FIG. 3 is a flowchart of a method performed by a Signal Module according to an embodiment.

FIG. 3 illustrates an example operation of the signal module 112. The signal module 112 may be initiated at step 300 by the base module 110. The signal module 112 may receive at step 302 a frequency and beamforming algorithm from the base module 110. If this is the first time the signal module 112 has been initiated, this step may be skipped.

The signal module 112 may select at step 304 a phased antenna array 104 to use based on the system mode. If no mode has yet been determined by the base module 110, the system 100 may be in a default mode. In the default mode, any and all phased antenna arrays 104 may be used. If a mode has been determined by the base module 110, the signal module 112 may use the phased antenna array 104 associated with the system mode in the mode database 120.

The signal module 112 may transmit at step 306 a signal from the selected phased antenna array 104. The signal may be sent out at the frequency, or range of frequencies, sent by the base module 110. If no frequency was received, the signal module 112 may sweep through a broad range of frequencies to capture all possible tracking tags 128. The signal module 112 may use the received beamforming algorithm to set the phase of each antenna in the selected phased antenna array 104. If no beamforming algorithm was received, the signal module 112 may transmit from each antenna at the same phase.

The signal module 112 may receive at step 308 signals via the selected phased antenna array 104. The signal module 112 may identify at step 310 which, if any, of the received signals are from tracking tags 128. These signals may be identified based on their frequency and modulation. In some embodiments, the reflected signal from a tracking tag 128 may contain a unique identifier.

The signal module 112 may calculate at step 312 the angle of arrival ( ) for each signal using phase and time delay data. This involves determining the direction from which each signal is arriving relative to the phased array. The signal module 112 may use the phase differences and time delays between the signals received at different antennas to calculate the AoA. This step is useful for understanding the spatial orientation of the signal sources and is a component in triangulating their positions. For example, the signal data indicates that a 2.4 GHz signal was received at antennas 1 and 2 of the selected phased antenna array 104. The signal was received 3 nanoseconds later at antenna 2, and the phase was shifted by 1 radian. Assume the antennas are 10 cm apart. The path difference (Δd) can be calculated using the time delay using the equation Δd=c×Δt, where c is the speed of light in air. For a Δt value of 3 nanoseconds, the path difference is 9 cm. The sine function of the AoA is equal to the path difference over the antenna separation, sin (AoA) =Δd/d. Evaluating this for a path distance of 9 cm gives an AoA of approximately 1.12 radians. For another example, the signal data indicates that a 2.4 GHz signal was received by antennas 3 and 4 of the selected phased antenna array 104. The signal was received 2 nanoseconds later at antenna 4, and the phase was shifted by 1 radian. Assume the antennas are 10 cm apart. The phase difference (Δϕ) can be converted to path difference (Δd) using Δd=(Δϕ·λ)/2π where λ is the wavelength. Wavelength can be calculated from (λ)=c/f, where c is the speed of light and f is frequency. Since the frequency is 2.4 GHz, the wavelength is 12.5 cm. Plugging in the wavelength and phase difference gives a path difference of about 2 cm. The sine function of the AoA is equal to the path difference over the antenna separation, sin (AoA)=Δd/d. Evaluating this for a path distance of 2 cm gives an AoA of approximately 0.20 radians. Using multiple methods of calculating the AoA allows the signal module 112 to check if all methods agree and, if not, to pick the most reliable method or approximate a value based on the answers of each method.

The signal module 112 may send at step 314 the signal data to the base module 110. The signal module 112 may return at step 316 to the base module 110.

Figure 4:
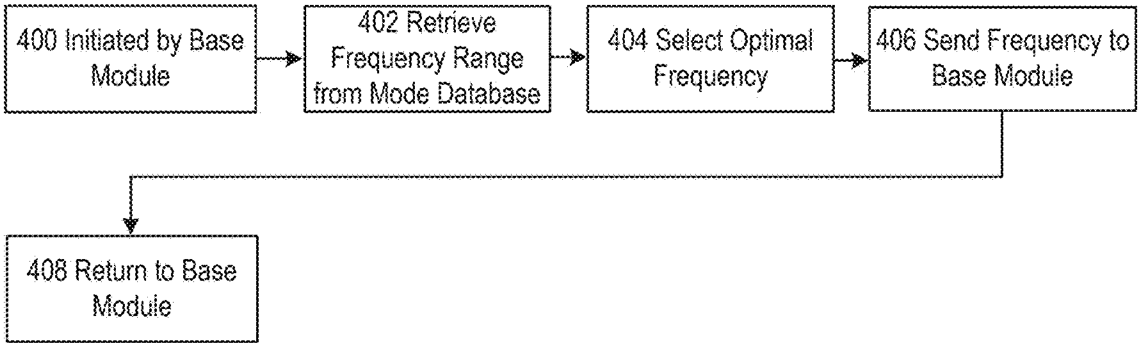
FIG. 4 is a flowchart of a method performed by a Frequency Module according to an embodiment.

FIG. 4 illustrates an example operation of the frequency module 114. The frequency module 114 may be at step 400 initiated by the base module 110. The frequency module 114 may retrieve at step 402 the frequency range in the mode database 120 for the current system mode. For example, in mode T2, the frequency range is 300-350 MHz.

The frequency module 114 may select at step 404 the optimal frequency in the frequency range. The optimal frequency may be determined based on multiple factors, such as the identity of the tracking tag 128, the estimated distance of the tracking tag 128 from the wireless base station 102, the likelihood of objects between the tracking tag 128 and the wireless base station 102, the capabilities of the phased antenna array 104, etc. For example, if the tracking tag 128 belongs to tag group 2, but this particular tracking tag 128 is known to respond better to signals at 325 MHz, then 325 MHz may be the optimal frequency. In some embodiments, the frequency module 114 may select multiple frequencies from the frequency range. If the frequency range only has one frequency, this step may be skipped.

The frequency module 114 may send at step 406 the optimal frequency to the base module 110. The frequency module 114 may return at step 408 to the base module 110.

Figure 5:
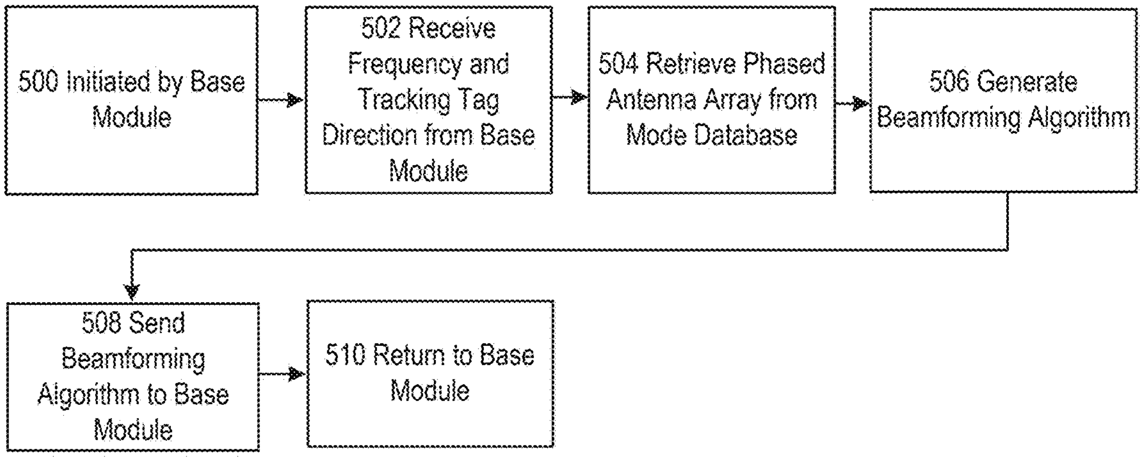
FIG. 5 is a flowchart of a method performed by a Beamforming Module according to an embodiment.

FIG. 5 illustrates an example operation of the beamforming module 116. The beamforming module 116 may be initiated at step 500 by the base module 110. The beamforming module 116 may receive at step 502 frequency and tracking tag direction from the base module 110.

The beamforming module 116 may retrieve at step 504 the phased antenna array 104 for the current system mode from the mode database 120.

The beamforming module 116 may generate at step 506 a beamforming algorithm. To generate a beamforming algorithm using a set frequency, a known antenna array, and a specified direction to the target, the beamforming module 116 may follow several technical steps. The beamforming module 116 may calculate the wavelength (λ) using the set frequency (f), where λ=c/fand c is the speed of light, approximately 3×10^8 m/s. The beamforming module 116 may define the configuration of the antenna array, such as a linear or circular arrangement, and specify the number of elements (N). For instance, in a linear array with element spacing (d), a common choice is d=λ/2 to minimize grating lobes. The direction of the target is then represented in spherical coordinates (θ for elevation angle and φ for azimuth angle). The steering vector (a(θ,ϕ) is computed for this direction. The steering vector may mathematically describe how the signals at each antenna should be adjusted in terms of phase to steer the phased antenna array 104 signal in a particular direction. The beamforming module 116 may calculate beamforming weights (w). A straightforward method is Delay-and-Sum beamforming, where w=(1/N)α*(θ,ϕ), with α*(θ,ϕ) being the complex conjugate of the steering vector. The beamforming module 116 may apply these beamforming weights to the signal to be transmitted (x), resulting in the output signal y=w*x. Other beamforming methods may also be used to generate the beamforming algorithm based on the system mode.

The beamforming module 116 may send at step 508 the generated beamforming algorithm to the base module 110. The beamforming module 116 may return at step 510 to the base module 110.

FIG. 6 illustrates an example operation of the signal processing module 118. The signal processing module 118 may be initiated at step 600 by the base module 110. The signal processing module 118 may receive at step 602 signal data from the base module 110.

The signal processing module 118 may identify at step 604 signal components in the signal data based on the tracking tag 128 group associated with the system mode. Tracking tags 128 may have known components, such as carrier frequency and modulation frequencies, which can be used to identify the components of the signal. The signal processing module 118 may demodulate at step 606 the signal using a demodulation method based on the system mode. For example, system mode T1 may use pattern recognition demodulation. Pattern recognition demodulation involves using pattern recognition techniques to identify the modulation scheme of a received signal and demodulate it accordingly. For another example, system mode T2 may use hybrid modulation recognition. Hybrid modulation recognition refers to the process of identifying and demodulating signals that use multiple modulation schemes simultaneously or switch between them dynamically.

The signal processing module 118 may calculate at step 608 angle of arrival (AoA) using a calculation based on system mode. For example, system mode T1 may use a MUSIC (Multiple Signal Classification) algorithm. MUSIC utilizes the eigenvalues and eigenvectors of the covariance matrix of the received signal to estimate AoA with high resolution by searching for peaks in the spatial spectrum. To address complex environments, a Multiple Signal Classification (MUSIC) algorithm can be used. In signal processing problems, the objective is to estimate from past measurements or expectations of measurements from a set of constant values upon which the received signals depend.

In an embodiment, in order to solve the multipath problem for high accuracy tracking, the MUSIC algorithm is used to estimate the AoA of one or more signals arriving at the antenna array. The MUSIC algorithm uses an eigenspace method to determine and express the phase shift between the antennas as a complex exponential.

$$\Phi(\theta) = e^{-j2\pi \sin(d)/\lambda}$$

$$\overrightarrow{\alpha(\theta)} = \left[\, 1 \;\; \Phi(\theta) \;\; \Phi(\theta)^2 \;\; \ldots \;\; \Phi(\theta)^{M-1} \,\right]$$

As shown above in the equation, the phase shift of an incoming signal F (q) is determined as a function of the distance between two antennas, d, and the wavelength of the signal 1. The vector a(0) represents an overall direction in which the antenna array will form a beam, wherein each element of the vector represents an individual multipath signal. For M number of antennas in the array, the vector a(q) includes M−1 processed signals. Due to the delay in transmission across the array, the vector a(q) may be used by the tracking system to steer a signal in the direction of the vector or to indicate that an incoming signal is received from the direction of the vector. The correlation matrix of an incoming signal x is given as Rxx, where eigenvectors of Rxx corresponding to its smallest eigenvalues are orthogonal to the steering vectors. Mathematically, this is done by evaluating the MUSIC spectrum according to the equation:

$$P_{MU}(\theta) = \frac{1}{\vec{a}(\theta)^H E_N E_N^H \vec{a}(\theta)}$$

In the above equation, H denotes the Hermitian self-adjoint matrix as a complex square matrix. EN is a matrix whose columns are the eigenvectors of Rxx corresponding eigenvalues smaller than a threshold value. Systems using the MUSIC algorithm to determine AoA for incoming signals typically need more antennas than propagation paths to resolve the incoming signals correctly. For example, the MUSIC algorithm resolves up to M−1 different signal paths (e.g., in the case of 3 antennas in the array, only 2 multipath signals can be differentiated). In one embodiment, the system overcomes the limitation of resolving M−1 signal paths by implementing multiple antennas, linked but not collocated, such that an interlinked mesh network processes signals received by the antennas as a fleet. Multiple sensors compute signal paths and the interlinked mesh network determines a true origin of the signal based on the computed paths to perform distributed spatial smoothing. Antennas may be selected or spaced for any number of multipath signals. For example, in high-frequency applications, the spacing of antenna elements can be selected based on the wavelength of multipath signals. Additionally, antennas rated for a high number of multipath signal can be larger than antennas rated for a lower number of multipath signals. In one embodiment, the antenna array includes one or more antenna with fewer antenna elements, and the interlinked mesh network is used to collect, process, and resolve data collected by the antenna array.

For another example, system mode T2 may use Estimation of Signal Parameters via Rotational Invariance Techniques (ESPRIT). ESPRIT analyzes the rotational invariance properties of the signal subspace to estimate AoA, providing high accuracy with reduced computational complexity compared to MUSIC.

In addition, or alternatively, the signal processing module 118 may use received signal strength to perform trilateration. Trilateration is an alternative method of determining the position of a signal source by calculating the distances between the source and multiple receiving antennas. Distance estimation can be performed using the AoA data, where known positions of the antennas and the angles of the incoming signal are used to infer the distance. However, a more direct and sometimes more precise method may involve deriving the distance from the difference in signal strength received at two or more antennas. The principle behind this method is based on the inverse relationship between signal strength and distance. As the distance from the signal source to the antenna increases, the signal strength decreases, typically following an inverse-square law or a similar attenuation model depending on the environment. In scenarios where trilateration is implemented, the signal processing module 118 may require at least three antennas to determine the exact location of the signal source. The use of three antennas allows the formation of three independent distance equations, which, when solved simultaneously, may provide a unique intersection point corresponding to the location of the signal source. The received signal strength at each antenna may provide the basis for calculating the respective distances. For example, if the signal at one antenna is stronger by a known percentage compared to another, the ratio of these signal strengths can be used to infer the ratio of the distances. By combining this information with the known physical separation between the antennas, the system can establish a set of nonlinear equations representing the distances from the source to each antenna. The solution involves finding the point where the calculated distances (based on signal strength differences) intersect, which represents the most likely location of the signal source relative to the antenna array. Furthermore, the accuracy of trilateration can be enhanced by incorporating additional antennas, which provide more distance measurements and, consequently, reduce the uncertainty in the position estimate. The use of more antennas allows for the implementation of overdetermined systems, where the additional data can be used to minimize errors and improve the robustness of the location estimation process. Trilateration is particularly advantageous in environments where the AoA measurement might be challenging due to multipath propagation or other interference effects that distort the apparent AoA. Trilateration may be used in place of or in conjunction with triangulation.

The signal processing module 118 may apply at step 610 Kalman filtering to predict and update the state of tracked objects. The Kalman filter uses a series of measurements observed over time, containing statistical noise and other inaccuracies, to produce estimates of unknown variables. It operates in a two-step process: prediction and update. During the prediction step, the Kalman filter uses the current state estimate to predict the state at the next time step. During the update step, the filter incorporates new measurements to correct the state estimate. This process helps to smooth out the tracking data and provides more accurate estimates of the positions and velocities of tracked objects.

The signal processing module 118 may apply at step 612 Joint Probabilistic Data Association (JPDA) to associate measurements with tracks probabilistically. JPDA is used in scenarios where there are multiple potential targets and measurements, and it is not clear which measurement corresponds to which target. The signal processing module 118 may calculate the probabilities of each measurement being associated with each track and update the tracks based on these probabilities. This method helps to resolve ambiguities and improves the accuracy of tracking in complex environments with multiple signal sources.

The signal processing module 118 may remove at step 614 outliers to ensure the accuracy of the tracking data. Outliers are measurements that deviate significantly from the expected values and can distort the tracking results. The signal processing module 118 may use statistical analysis and predefined thresholds to identify and filter out these erroneous data points. By removing outliers, the system 100 improves the reliability and precision of the tracking data, ensuring that only accurate and consistent measurements are used in the final tracking calculations.

The signal processing module 118 may send at step 616 the finalized signal data to the base module 110. The signal data may include tracking data. This tracking data may include the calculated location of the tracking tag 128 based on received signals. For example, the signal data may indicate that the selected tracking tag 128 is at the coordinates (91 cm, 181 cm, −2 cm). The data may also include metadata such as confidence level and margin of error. The signal data may also contain any data embedded in the reflected signal by the tracking tag 128, such as an identification code. The signal processing module 118 may return at step 618 to the base module 110.

FIG. 7 illustrates an example of the mode database 120. The mode database 120 may contain the possible modes of the system 100. Each mode may be optimized to send and receive signals from a specific group of tracking tags 128. Mode entries may include the optimal phased antenna array 104, frequency or frequencies, beamforming method, and signal processing algorithms used for the specific group of tracking tags 128. These parameters may be the optimal method for sending and receiving information from a tag group. These parameters may be established through testing and/or manufacturer specifications. The phased antenna array 104 associated with each mode may be configured to perform the frequency transmitting and beamforming functions associated with that mode.

Figure 8:
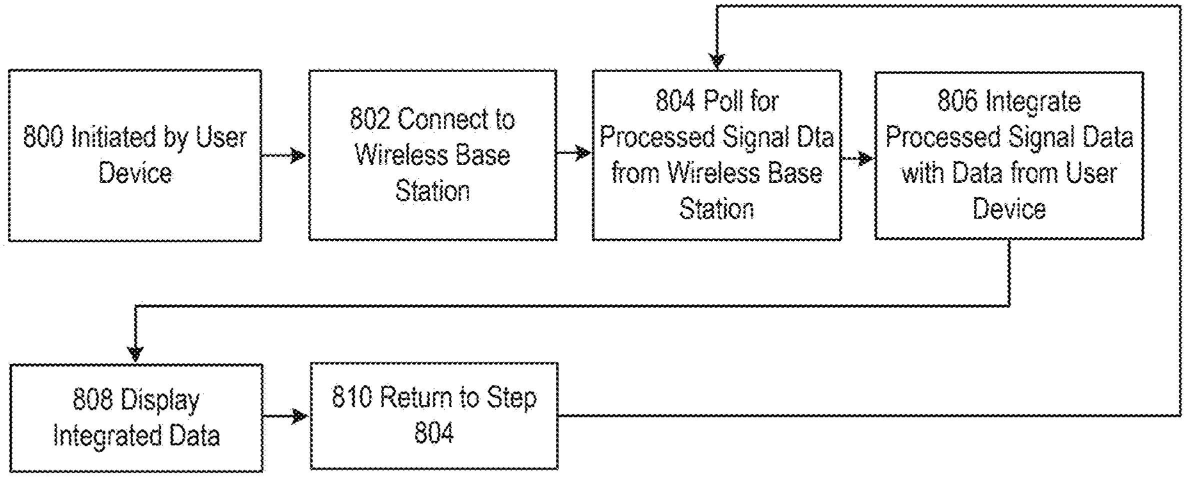
FIG. 8 is a flowchart of a method performed by a Tag Tracking Module according to an embodiment.

FIG. 8 illustrates an example operation of the tag tracking module 126. The tag tracking module 126 may be initiated at step 800 by the user device 124. For example, a user may open an application that includes the tag tracking module.

The tag tracking module 126 may connect at step 802 to the wireless base station 102 via the communication interface 122. The tag tracking module 126 may poll at step 804 for processed signal data from the base module 110 of the wireless base station 102.

The tag tracking module 126 may integrate at step 806 the processed signal data with other data on the user device 124. This data may be any data available to the user device 124, such as GPS data, building layout data, camera data, IOT data, or any other data stored locally on the user device 124 or accessible through a network such as a cloud. For example, signal data may be integrated with IoT data to identify the tracking tags 128 so that the IoT devices attached to the tracking tags 128 can be identified. For another example, GPS data can be integrated so that the locations of the tracking tags 128 can be overlayed on a global position map.

The tag tracking module 126 may display at step 808 the integrated data to the user. For example, the user may see a graphical representation of a map that shows the locations of the tracking tag 128. Suppose the user device 124 does not have display capabilities. In that case, the data may be relayed as text coordinate data and/or sent to a device with display capabilities, such as a monitor or terminal. The tag tracking module 126 may return at step 810 to step 804. The tag tracking module 126 may continue to loop until the user chooses to end the module.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for tracking devices in an environment, the system comprising:

memory that stores information regarding a plurality of metamaterial asset tags each attached to a particular device to be tracked and corresponding to a particular tag group that is associated with at least one frequency, a beamforming method, and at least one signal processing algorithm;

a phased antenna array that transmits a first signal to the metamaterial asset tags and receives one or more response signals corresponding to at least one of the metamaterial asset tags;

at least one processor operatively connected to the phased antenna array, wherein the at least one processor executes instructions stored in memory to:

determine a direction of the at least one metamaterial asset tag based on the response signals;

determine a tag group for the at least one metamaterial asset tag based on the response signals, wherein the phased antenna array transmits a beamformed signal using the at least one frequency and the beamforming method associated with the determined tag group in the determined direction of the at least one metamaterial asset tag and receives an updated response signal from the at least one metamaterial asset tag; and use the at least one signal processing algorithm associated with the determined tag group to determine a location of the at least one metamaterial asset tag based on the updated response signal.

2. The system of claim 1, wherein determining the direction of the at least one metamaterial asset tag based on the response signal includes determining an Angle of Arrival (AoA) of the response signal using phase and time delay data from the response signal.

3. The system of claim 1, wherein the at least one frequency includes a plurality of frequencies, and wherein transmitting the beamformed signal includes transmitting the beamformed signal using each of the plurality of frequencies.

4. The system of claim 1, wherein the response signal is based on modulation of the first signal by the metamaterial asset tag.

5. The system of claim 1, wherein using the at least one signal processing algorithm to determine the location of the at least one metamaterial asset tag based on the updated response signal includes triangulating the location of the at least one metamaterial asset tag using phase and time delay data from the updated response signal or trilaterating the location of the at least one metamaterial asset tag based on received signal strengths.

6. The system of claim 1, wherein the phased antenna array includes a plurality of phased antennas, and wherein the processor executes further instructions to determine one or more of the plurality of phased antennas to use for transmitting the beamformed signal based on the determined tag group.

7. The system of claim 1, wherein the beamforming method is selected from the group consisting of digital, orthogonal frequency division multiplexing, and frequency-domain beamforming.

8. The system of claim 1, wherein the signal processing algorithm includes a demodulation algorithm selected from the group consisting of pattern recognition, hybrid modulation recognition, and phase-locked loop.

9. The system of claim 1, wherein the signal processing algorithm includes an Angle of Arrival (AoA) algorithm selected from the group consisting of Multiple Signal Classification (MUSIC), Estimation of Signal Parameter via Rotational Invariance Technique (ESPRIT), and Phase Interferometry.

10. The system of claim 1, further comprising a communication interface that transmits the location of the at least one metamaterial asset tag to a user device.

11. A method for tracking devices in an environment, the method comprising:

storing information in memory regarding a plurality of metamaterial asset tags each attached to a particular device to be tracked and corresponding to a particular tag group that is associated with at least one frequency, a beamforming method, and at least one signal processing algorithm;

transmitting a first signal via a phased antenna array to the plurality of metamaterial asset tags;

receiving, via the phased antenna array, one or more response signals corresponding to at least one of the metamaterial asset tags, respectively;

determining a direction of the at least one metamaterial asset tag based on the response signals;

determining a tag group for the at least one metamaterial asset tag based on the response signals;

transmitting, via the phased antenna array, a beamformed signal using the at least one frequency and the beamforming method associated with the determined tag group in the direction of the at least one metamaterial asset tag;

receiving, via the phased antenna array, an updated response signal from the at least one metamaterial asset tag; and using the at least one signal processing algorithm associated with the determined tag group to determine a location of the at least one metamaterial asset tag based on the updated response signal.

12. The method of claim 11, wherein determining the direction of the at least one metamaterial asset tag based on the response signal includes determining an Angle of Arrival (AoA) of the response signal using phase and time delay data from the response signal.

13. The method of claim 11, wherein the at least one frequency includes a plurality of frequencies, and wherein transmitting the beamformed signal includes transmitting the beamformed signal using each of the plurality of frequencies.

14. The method of claim 11, wherein the response signal is based on modulation of the first signal by the at least one metamaterial asset tag.

15. The method of claim 11, wherein using the at least one signal processing algorithm to determine location of the at least one metamaterial asset tag based on the updated response signal includes triangulating the location of the at least one metamaterial asset tag using phase and time delay data from the updated response signal or trilaterating the location of the at least one metamaterial asset tag based on received signal strengths.

16. The method of claim 11, wherein the phased antenna array includes a plurality of phased antennas, and further comprising determining one or more of the plurality of phased antennas to use for transmitting the beamformed signal based on the determined tag group.

17. The method of claim 11, wherein the beamforming method is selected from the group consisting of digital, orthogonal frequency division multiplexing, and frequency-domain beamforming.

18. The method of claim 11, wherein the signal processing algorithm includes a demodulation algorithm selected from the group consisting of pattern recognition, hybrid modulation recognition, and phase-locked loop.

19. The method of claim 11, wherein the signal processing algorithm includes an Angle of Arrival (AoA) algorithm selected from the group consisting of Multiple Signal Classification (MUSIC), Estimation of Signal Parameter via Rotational Invariance Technique (ESPRIT), and Phase Interferometry.

20. The method of claim 11, further comprising transmitting, the location of the at least one metamaterial asset tag to a user device via a communication interface.

* * * * *